(12) United States Patent
Melkisetoglu et al.

(10) Patent No.: US 8,224,094 B2
(45) Date of Patent: Jul. 17, 2012

(54) METHOD AND SYSTEM FOR SIDE DETECTION OF 3D UNDETAILED EAR IMPRESSIONS

(75) Inventors: Rupen Melkisetoglu, Princeton, NJ (US); Tong Fang, Morganville, NJ (US); Fred McBagonluri, East Windsor, NJ (US); Gregory G. Slabaugh, Princeton, NJ (US)

(73) Assignees: Siemens Audiologische Technik GmbH, Erlangen (DE); Siemens Corporation, Iselin, NJ (US)

( * ) Notice: Subject to any disclaimer, the term of this patent is extended or adjusted under 35 U.S.C. 154(b) by 1085 days.

(21) Appl. No.: 12/154,951

(22) Filed: May 28, 2008

(65) Prior Publication Data

US 2008/0310728 A1 Dec. 18, 2008

Related U.S. Application Data

(60) Provisional application No. 60/943,937, filed on Jun. 14, 2007.

(51) Int. Cl.
*G06K 9/46* (2006.01)
(52) U.S. Cl. .......................... 382/190; 382/115; 345/420
(58) Field of Classification Search .................. 382/115, 382/190; 345/420; 715/810
See application file for complete search history.

(56) References Cited

U.S. PATENT DOCUMENTS
| | | | |
|---|---|---|---|
| 2007/0057941 A1 | 3/2007 | Fang et al. | |
| 2007/0057942 A1 | 3/2007 | Unal et al. | |
| 2008/0143712 A1* | 6/2008 | McBagonluri et al. | 345/420 |

FOREIGN PATENT DOCUMENTS
| | | |
|---|---|---|
| EP | 1 772 827 A | 4/2007 |
| WO | 2006/027743 A | 3/2006 |

OTHER PUBLICATIONS

Zouhar, A., et al., "Anatomically-Aware, Automatic, and Fast Registration of 3D Ear Impression Models", 3rd Int'l Symp. on 3D Data Process. Visual. & Transm. (3DPVT), 2006.
Yan et al., "Empirical Evaluation of Advanced Ear Biometrics", Computer Vision and Pattern Recognition, 2005 CVPR, IEEE Computer Society Conference on San Diego, CA, Jun. 20-26, 2005, Piscataway, NJ, IEEE, vol. 3, Jun. 20, 2005.
Chen et al., "Human Ear Recognition in 3D", IEEE Transactions on Pattern Analysis and Machine Intelligence, IEEE Service Center, Los Alamitos, CA, US, vol. 29, No. 4, Apr. 1, 2007, pp. 718-737.
Petitjean, "Chirality and Symmetry Measures: A Transdisciplinary Review", Entropy, vol. 5, No. 3, 2003, pp. 271-312.
European Search Report including European Search Opinion, Nov. 10, 2008.

* cited by examiner

*Primary Examiner* — Matthew Bella
*Assistant Examiner* — Ruiping Li

(57) ABSTRACT

A method and system for side detection of an undetailed 3D ear impression is disclosed. In order to determine whether a received 3D undetailed ear impression is a left or right ear impression, a local coordinate system of the 3D undetailed ear is defined based on side independent features of the 3D undetailed ear impression. A skeleton (or center spline) of the 3D undetailed ear impression is detected, and it is determined whether the 3D undetailed ear impression is a left or right ear impression based on the skeleton and the local coordinate system.

22 Claims, 9 Drawing Sheets

METHOD AND SYSTEM FOR SIDE DETECTION OF 3D UNDETAILED EAR IMPRESSIONS

This application claims the benefit of U.S. Provisional Application No. 60/943,937, filed Jun. 14, 2007, the disclosure of which is herein incorporated by reference.

BACKGROUND OF THE INVENTION

The present invention generally relates to side detection of 3D undetailed ear impressions, and more particularly to detecting whether a 3D undetailed ear impression is an impression of a left or right ear.

A 3D undetailed ear impression is a 3D data of an ear generated by a 3D scan of a patient's ear. 3D undetailed ear impressions can be used to manually or automatically generate hearing aid shells that fit a patient's ear. In order to generate hearing aid shells automatically, feature recognition must be performed on a 3D undetailed ear impression to detect features of the impression such as the ear canal, aperture, concha, tragus, helix, notch, and crus. The recognition of many of the features of 3D undetailed impression is dependent on whether the undetailed 3D ear impression is an impression of a left or right ear. However, feature recognition techniques used in hearing aid shell generation do not classify the side (left or right) of the 3D undetailed ear impression as a feature to be detected, but consider the side as a pre-condition necessary to detect other features. Accordingly, in typical feature detection techniques the features can only be detected if it is already known whether the 3D undetailed ear impression is a left or right ear impression.

BRIEF SUMMARY OF THE INVENTION

As used herein, "side detection" of a 3D undetailed ear impression refers to determining whether the 3D undetailed ear impression is an impression of a left or right ear. Embodiments of the present invention provide robust, fully automatic side detection of a 3D undetailed ear impression. Such robust side detection increases the robustness of feature recognition techniques used to detect ear features of a 3D undetailed ear impression, since it is no longer required that the side of the ear be known prior to receiving the ear impression. This can lead to improvements in the automatic generation of hearing aid shells.

In one embodiment of the present invention, a 3D undetailed ear impression is received. A local coordinate system of the 3D undetailed ear impression is defined based on side independent features of the 3D undetailed ear impression. For example, a y direction of the local coordinate system can be defined based on a bottom plane detected in the 3D undetailed ear impression. An x direction of the local coordinate system can be defined based on the y direction and an aperture plane detected in the 3D undetailed ear impression. A z direction of the local coordinate system can be defined based on the x and y directions. A skeleton (or center spline) of the 3D undetailed ear impression is detected, and it is determined whether the 3D undetailed ear impression is a left or right ear impression based on the skeleton and the local coordinate system. For example, a reference direction can be determined for the skeleton, and the dot product of the reference direction and the x direction of the local coordinate system can be calculated. The 3D undetailed ear impression is determined to be a right ear impression if the dot product is positive and a left ear impression if the dot product is not positive.

These and other advantages of the invention will be apparent to those of ordinary skill in the art by reference to the following detailed description and the accompanying drawings.

DETAILED DESCRIPTION OF EXEMPLARY EMBODIMENTS

The present invention is directed to a method for side detection of a 3D undetailed ear impression. As used herein, side detection of a 3D undetailed ear impression refers to determining whether the 3D undetailed ear impression is an impression of a left or right ear. Embodiments of the present invention are described herein to give a visual understanding of the side detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. For example, according to various embodiments of the present invention, electronic data representing a 3D undetailed ear impression is manipulated within a computer system in order to determine whether the impression is of a left or right ear.

Figure 1:
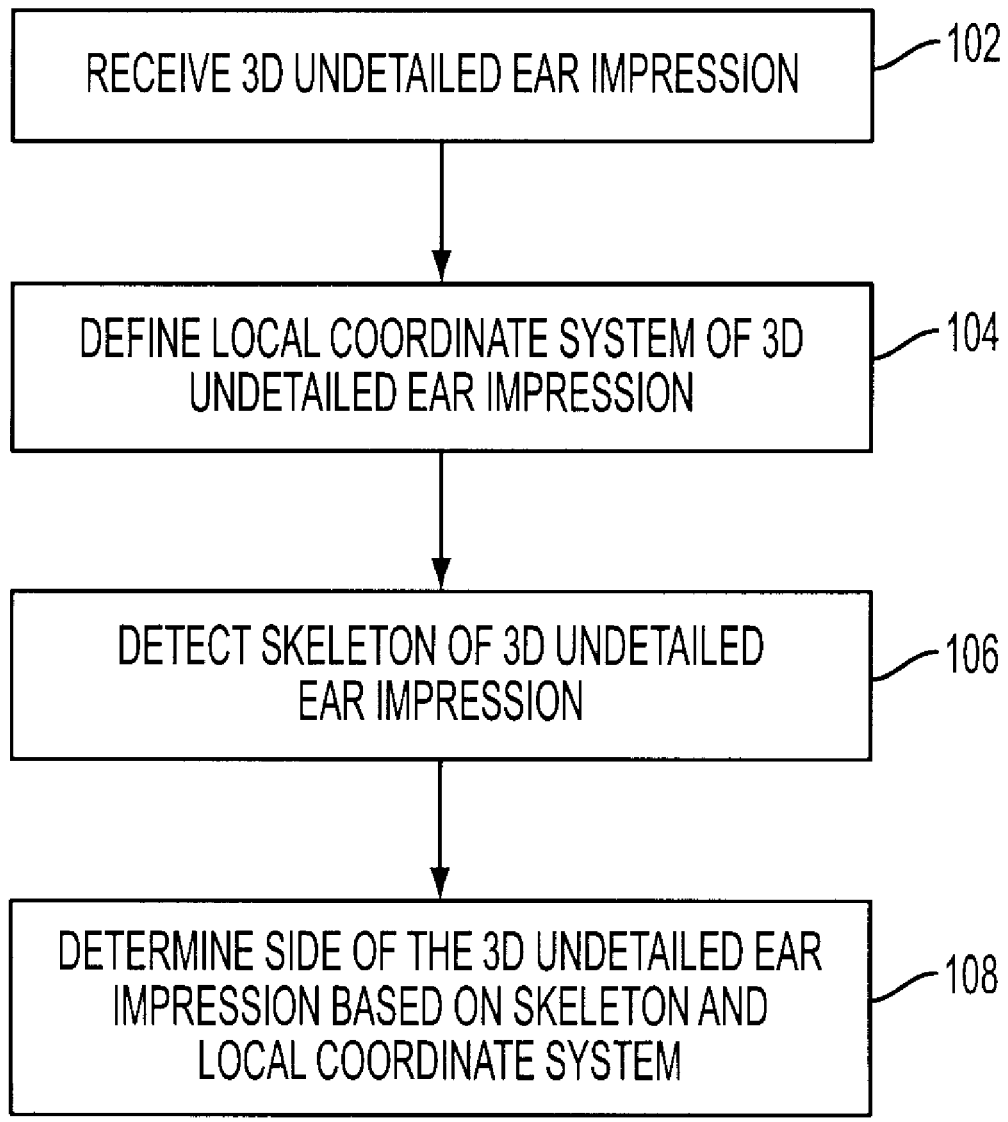
FIG. 1 illustrates a method for side detection of a 3D undetailed ear impression according to an embodiment of the present invention.

FIG. 1 illustrates a method for side detection of a 3D undetailed ear impression according to an embodiment of the present invention. Referring to FIG. 1, at step 102, a 3D undetailed ear impression is received. A 3D undetailed ear impression is 3D data of an ear mold generated using a 3D scanner. The 3D undetailed ear impression resulting from a 3D scanner is typically a 3D point cloud representing the shape of the scanned ear. A computer system performing the steps of the method of FIG. 1 can receive the 3D point cloud by loading a previously scanned 3D point cloud from a memory or storage of the computer system or from a computer readable medium. Once the 3D point cloud is received, it can be triangulated using surface reconstruction techniques to generate a surface of the 3D undetailed ear impression.

Figure 2:
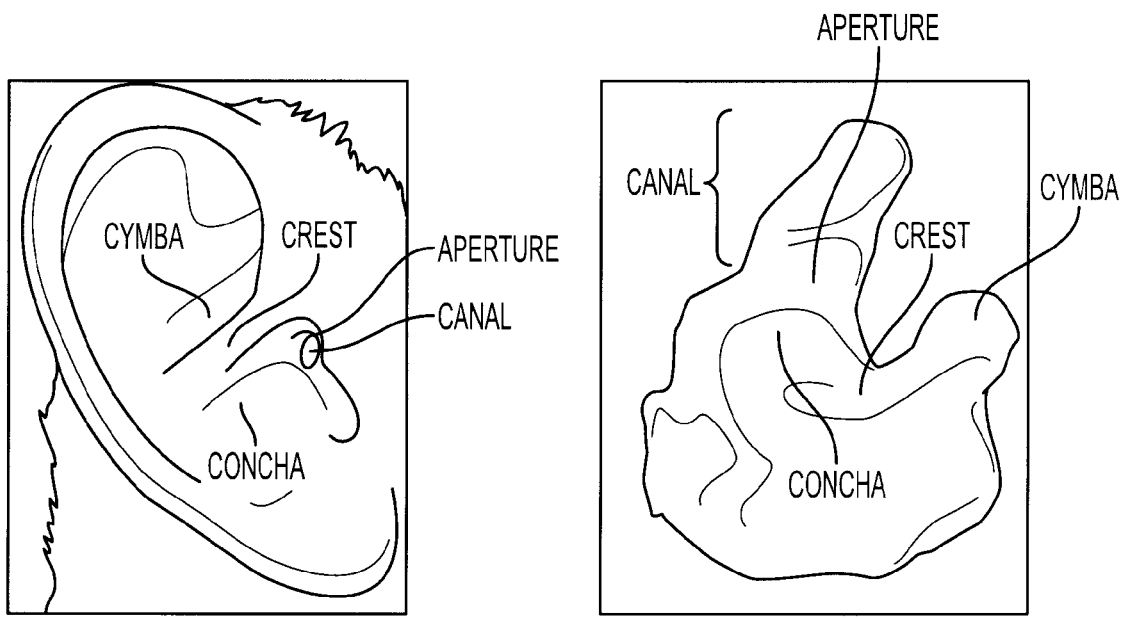
FIG. 2 illustrates an exemplary 3D undetailed ear impression.

FIG. 2 illustrates an exemplary 3D undetailed ear impression. As illustrated in FIG. 2, image 202 shows an ear and image 204 shows a 3D undetailed ear impression corresponding to the ear of image 202. The 3D undetailed ear impression of image 204 is shown after triangulation. A 3D ear impression depicts important features of the ear, such as the ear canal, aperture, concha, tragus, helix (cymba), notch, and crus. Images 202 and 204 show locations of aperture, crus, ear canal, and concha on the ear and their corresponding locations in the 3D undetailed ear impression. Due to the variable shape of the human ear, or as a result of 3D scanning defects, some of theses features may not be available in an undetailed impression. Accordingly, the side detection method of FIG. 1 utilizes features which are side independent and available in every 3D undetailed ear impression.

Figure 3:
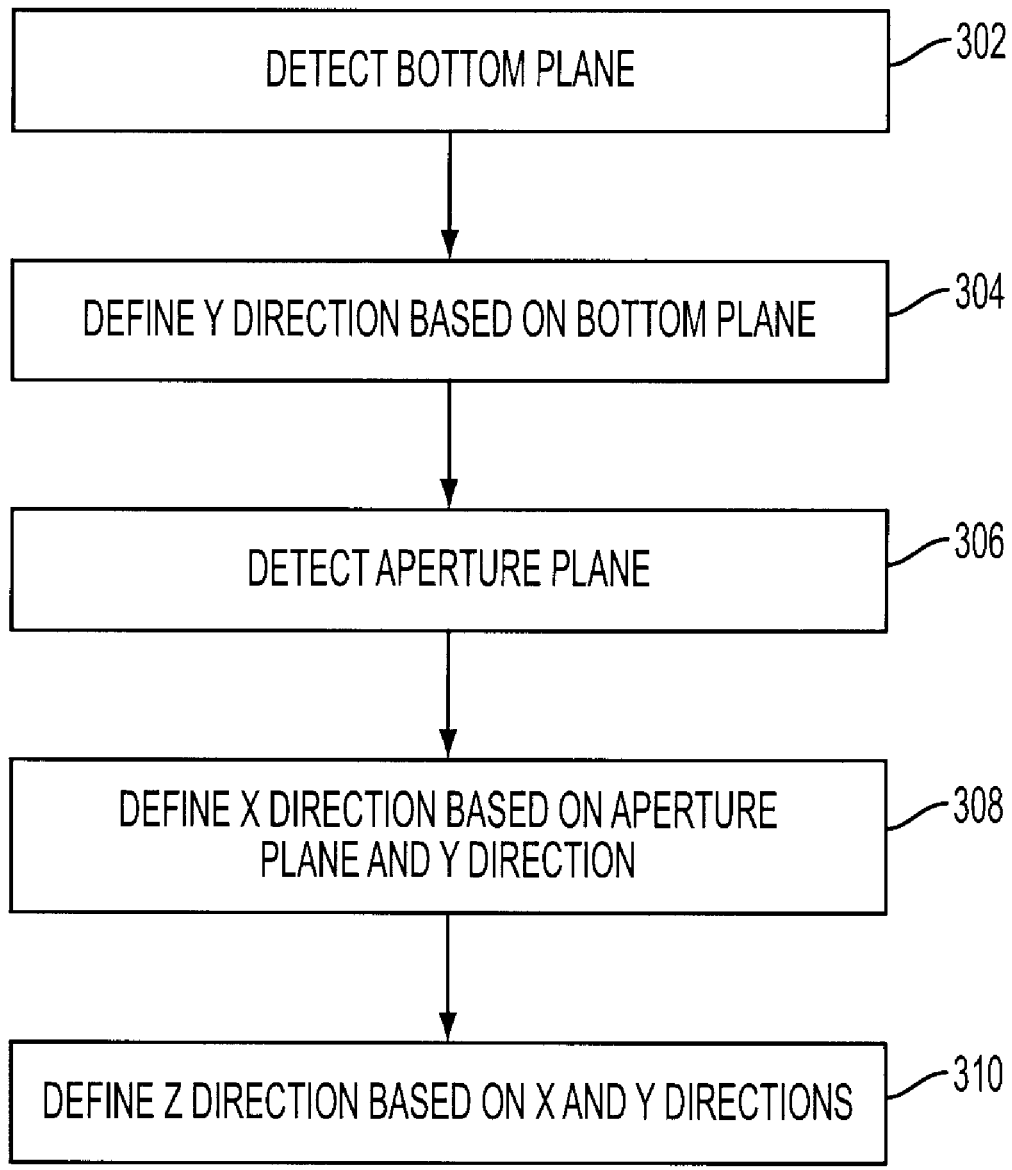
FIG. 3 illustrates a method for defining a local coordinate system of a 3D undetailed ear impression according to an embodiment of the present invention.

Returning to FIG. 1, at step 104, a local coordinate system (LCS) of the 3D undetailed ear impression is defined. The LCS of the 3D undetailed ear impression is defined based on side independent ear features in the 3D undetailed ear impression. In particular, the LCS of the 3D undetailed ear impression can be defined based on the bottom plane and the aperture of the 3D undetailed ear impression. FIG. 3 illustrates a method for defining the LCS of the 3D undetailed ear impression according to an embodiment of the present invention. Accordingly, the method of FIG. 3 can be performed to implement step 104 of FIG. 1.

Figure 4:
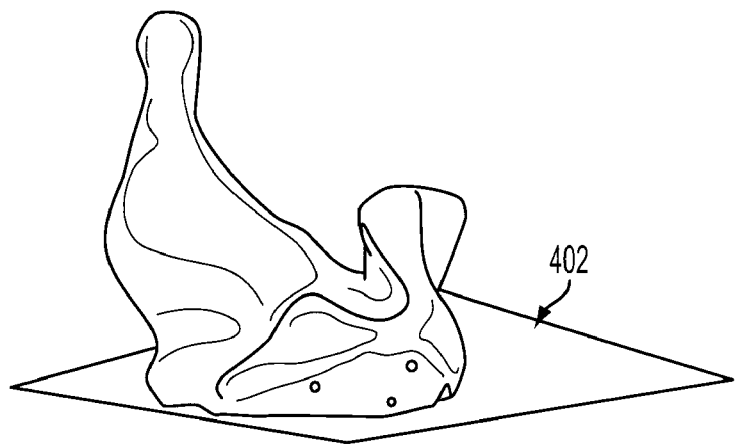
FIG. 4 illustrates bottom plane detection for an exemplary 3D undetailed ear impression.

Referring to FIG. 3, at step 302, the bottom plane of the 3D undetailed ear impression is detected. The bottom plane is a feature that is always available in a 3D undetailed ear impression. FIG. 4 illustrates bottom plane detection for an exemplary 3D undetailed ear impression. As shown in FIG. 4, the 3D undetailed ear impression has an open bottom. After the triangulation of the 3D point cloud, the boundary edges of the surface of the 3D undetailed ear impression form a boundary contour that is always the bottom of the impression. The first and second principal components of the contour are major and minor axes of the contour. The first and second principal components are used to determine the third component using the cross product. The third component defines a normal direction to the bottom plane. The center of the contour defines a point on the bottom plane, and the bottom plane is defined using the normal direction defined by the third component and the point information defined by the center of the contour. As illustrated in FIG. 4 bottom plane 402 is defined for a 3D undetailed ear impression.

Referring to FIGS. 3 and 4, at step 304, the y direction of the LCS is defined based on the bottom plane. The third component of the contour can be considered as the y direction of the LCS after its orientation is corrected to be from the mass center of the 3D undetailed ear impression through the bottom plane.

Figure 5A:
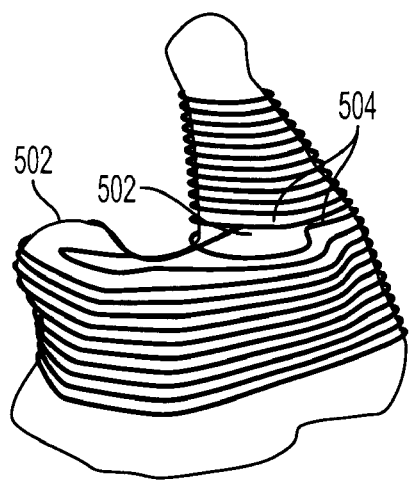
FIG. 5 illustrates aperture detection for an exemplary 3D undetailed ear impression.
Figure 5B:
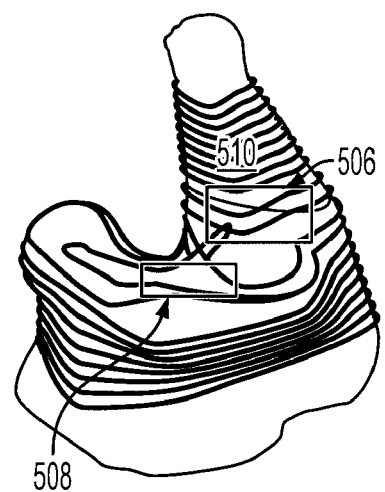

At step 306, an aperture plane of the 3D undetailed ear impression is detected. The aperture is a feature that can be considered a characteristic contour that connects the canal with the rest of the impression body. The aperture is side independent and is most likely available on all 3D undetailed ear impressions. The detection of the aperture plane is based on the shape variety of vertically scanned contour lines. FIG. 5 illustrates aperture detection for an exemplary 3D undetailed ear impression. A vertical scan of the 3D undetailed ear impression surface results in a set of contours. Image (a) of FIG. 5 shows a set of contours resulting from a vertical scan of an ear impression. If more than one contour line exists at a particular scan level, some contour lines are removed, while one contour line is kept at each level. For example, in image (a) FIG. 5, contour lines 502 are removed, while keeping the contour lines 504 along the canal and lower portion of the ear impression. Usually the number of contour lines at one level will not exceed three. The remaining set of contour lines is referred to as the aperture profile. Image (b) of FIG. 5 shows the aperture profile. The aperture profile is extracted from the complete set of vertical scan lines starting at the canal tip downwards to the bottom of the surface. If there is only one contour at scan level i, it is directly considered as part of the aperture profile. If there is more than one contour line at scan level i, only the contour whose center has the minimal distance from the center of the contour extracted at scan level i−1 is kept as part of the aperture profile. Regions 506 and 508 of the aperture profile are locations of significant changes of contour shapes, and contour line 510 is the aperture contour.

Weighted filtering that assigns weights of higher importance to canal and concha areas is used on the first derivative of measures calculated on each scan line contour in order to extract an aperture profile function whose maximum value defines the contour index corresponding to the aperture scan line contour. The weighted filtering and the aperture profile function are expressed as:

$$val_i = f_i \cdot (d_i - d_{i-1}), \quad f_1 = 1 - i/N, \quad 2 \le i \le N \quad (1)$$

$$pos = \arg\max_i(val_i) - 1, \quad 1 \le pos \le N - 1. \quad (2)$$

Figure 6:
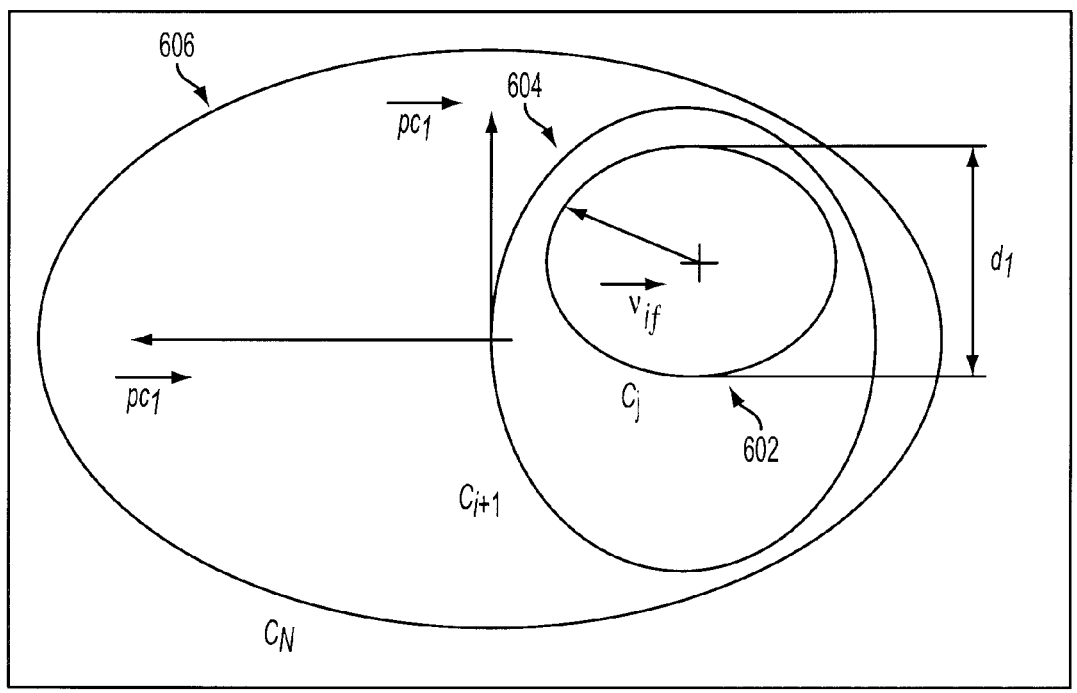
FIG. 6 illustrates a schematic top view of aperture profile contour lines.

In Equation (1), N denotes the number of contour lines. FIG. 6 illustrates a schematic top view of aperture profile contour lines. The smaller contours 602 and 604 depict canal and concha areas, respectively. Points of contour line i are considered as vectors $\vec{v}_{ij}$ originating from the center of the contour line. The value $d_i$ measures the difference between the two maximum projection values of these vectors onto the second principal component $\vec{pc}_2$ of the lowest contour line $c_N$ (606). Accordingly, it is expected that the first-order backward difference $d_i - d_{i-1}$ has its maximum value at the desired object position, e.g., region 506 of FIG. 5. However, $d_i - d_{i-1}$ alone may not be robust enough to handle all cases. For example, objects with a shallow concha may be candidates for misclassifications, and contours below the expected aperture can be selected instead of the aperture. As a countermeasure, differences of subsequent $d_i$ are weighted with the factor $f_i$, which assigns a higher importance to the canal regions. Accordingly, Equation (1) selects the contour at which the greatest weighted $d_i$ change from the previous contour occurs, and Equation (2) determines the aperture contour, which is one contour position above the contour selected by Equation (2).

Returning to FIG. 3, at step 308, the x direction of the 3D undetailed ear impression is defined based on the aperture plane and the y direction. A direction can be defined from the center of the aperture contour ($Center_{AP}$) and the center of the contour that is one below the aperture contour ($Center_{AP-1}$). The x direction of the LCS of the 3D undetailed ear impression is defined as the cross product the y direction of the LCS and the direction defined from $Center_{AP}$ to $Center_{AP-1}$.

At step 310, the z direction is defined based on the x and y direction. The z direction of the LCS of the 3D undetailed ear impression is defined as the cross product of the x direction and the y direction of the LCS. Accordingly, the x, y, and z directions define the LCS of the 3D undetailed ear impression.

Figure 7:
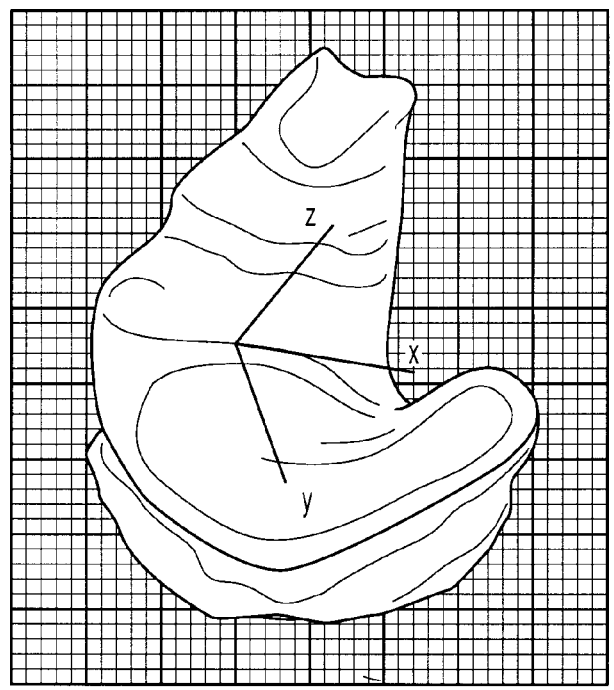
FIG. 7 illustrates a local coordinate system of a right ear impression.
Figure 8:
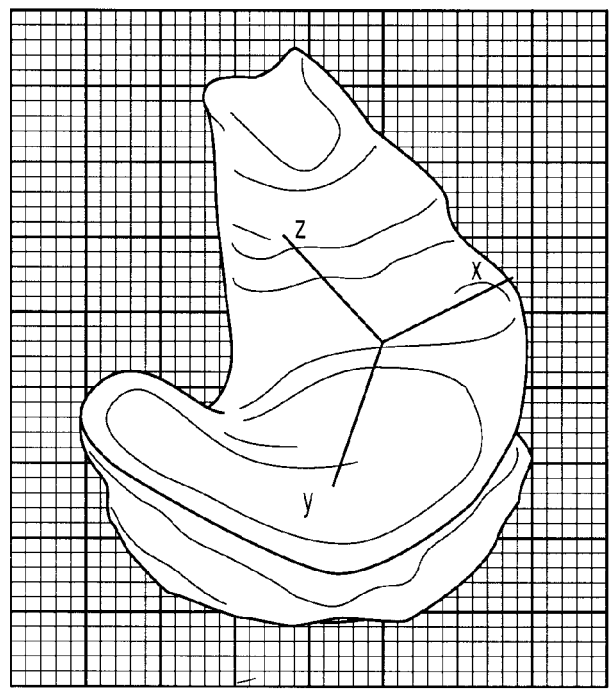
FIG. 8 illustrates a local coordinate system of a left ear impression.

FIGS. 7 and 8 illustrate an LCS of a right ear impression and a left ear impression, respectively. As illustrated in FIG. 7, in the right 3D undetailed ear impression, the y direction of the LCS points from the center of mass of the impression to the bottom of the impression, the z direction points from the aperture to the canal opening, and the x direction points from the concha to the helix. As illustrated in FIG. 8, in the left 3D undetailed ear impression, the y direction of the LCS points from the center of mass of the impression to the bottom of the impression and the z direction points from the aperture to the canal opening. However, the x direction of the LCS for the left ear impression is not direction from the concha to the helix, but instead directed from the helix toward the concha. Accordingly, it is the negative x direction in the left ear impression that points from the concha toward the helix.

Returning to FIG. 1, at step 106, a skeleton of the 3D undetailed ear impression is detected. As described above, LCS creation without the side information gives only the y and z directions robustly, and the sign of the x direction remains uncertain and requires side information to be corrected. In order to determine the side information, another feature must be extracted in the 3D undetailed ear impression that is not side dependent. The skeleton (or center spline) of the 3D undetailed ear impression is a feature that can be detected that is robust and does not require side knowledge of the impression. The skeleton is obtained by generating center points of a vertically scanned impression according to a bottom plane orientation. A spline is then fitted to the center points and the impression is re-scanned at each spline point to obtain new center points. A new spline is fitted to these center points to generate a smooth skeleton of the 3D undetailed ear impression.

Figure 9:
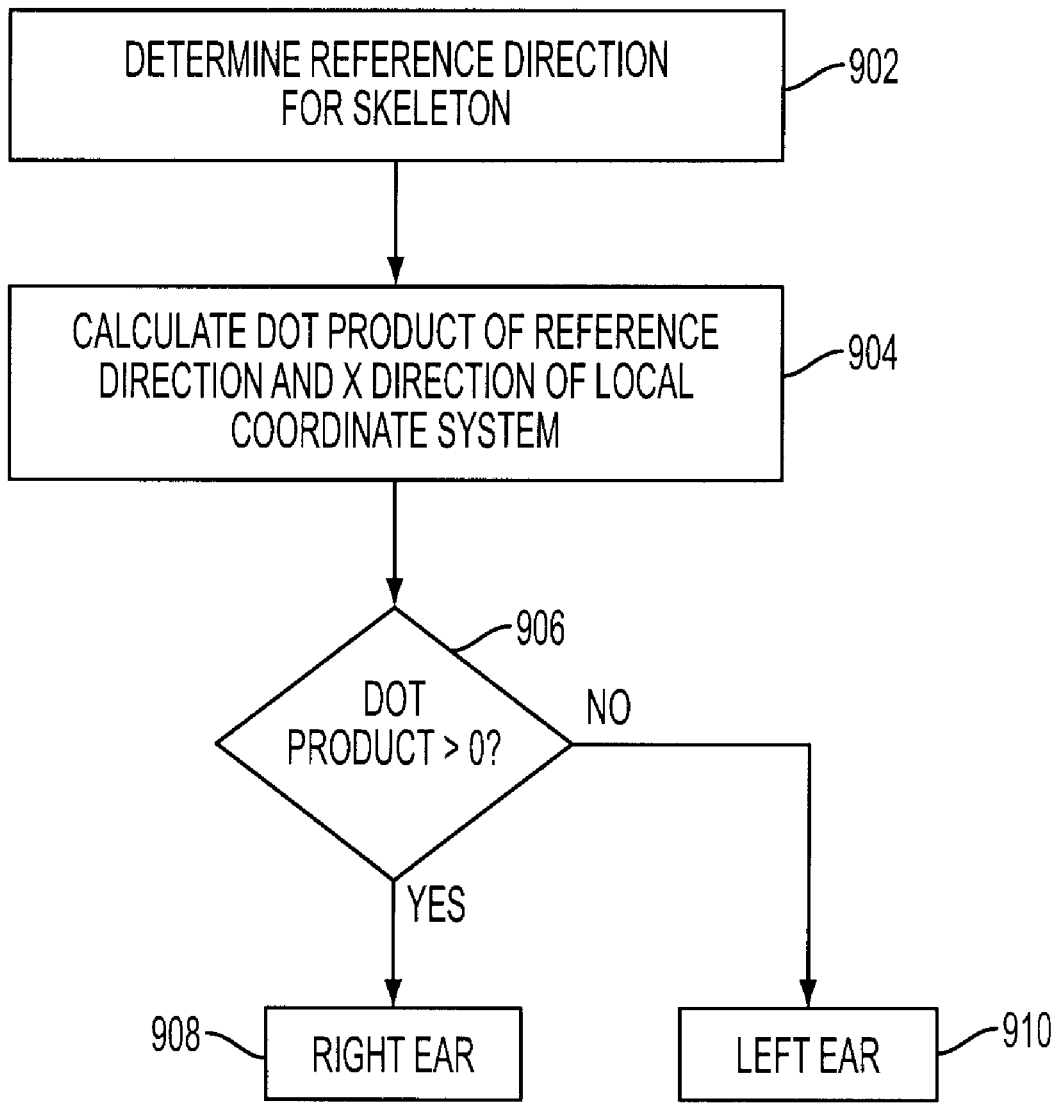
FIG. 9 illustrates a method for determining a right or left side for a 3D undetailed ear impression based on a skeleton and a local coordinate system according to an embodiment of the present invention.
Figure 10:
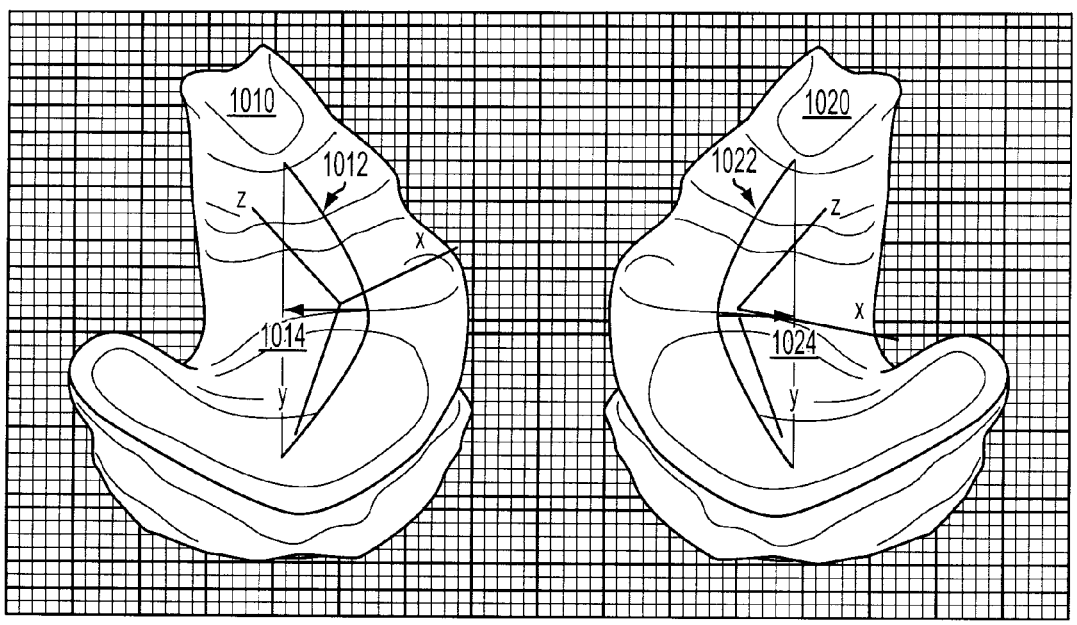
FIG. 10 illustrates side determination of exemplary left and right 3D undetailed ear impressions.

At step 108, the side of the 3D undetailed ear impression is determined based on the skeleton and the LCS. FIG. 9 illustrates a method for determining a right or left side for the 3D undetailed ear impression based on the skeleton and LCS according to an embodiment of the present invention. Accordingly, the method of FIG. 9 can be performed to implement step 108 of FIG. 1. FIG. 10 illustrates side determination of exemplary left and right 3D undetailed ear impressions. As illustrated in FIG. 10, a left 3D undetailed ear impression 1010 and a right 3D undetailed ear impression 1020 each have an LCS (x, y, z) and a skeleton 1012 and 1022.

Referring to FIG. 9, at step 902, a reference direction is determined for the skeleton. The reference direction for a skeleton points from the center of the spline defining the skeleton to a point on the 3D undetailed ear impression that is the average of the two end points of the spline. As illustrated in FIG. 10, reference direction 1014 is determined for skeleton 1012 and reference direction 1024 is determined for skeleton 1022. At step 904, the dot product of the reference direction and the x direction of the LCS is calculated. At step 906, it is determined whether the dot product is positive. If the dot product the reference direction and the x direction of the LCS is positive, the 3D undetailed ear impression is a right ear impression (908). Otherwise, the 3D undetailed ear impression is a left ear impression (910). As shown in FIG. 10, the reference direction 1014 of the skeleton 1012 of the left 3D undetailed ear impression 1010 points in an approximately opposite direction from the x direction of the LCS, such that the dot product of the reference direction 1014 and the x direction is negative. The reference direction 1024 of the skeleton 1022 of the right 3D undetailed ear impression 1020 points in approximately the same direction as the x direction of the LCS, such that the dot product of the reference direction 1024 and the x direction is positive.

Once it is determined whether the 3D undetailed ear impression is a left or right ear impression, additional features can be detected in the 3D undetailed ear impression, such as the concha, helix, tragus, and anti-tragus. Accordingly, using the side detection method described above, the side of the 3D undetailed ear impression is not required as prior knowledge to feature detection and can be automatically detected. This automatic side detection of an undetailed ear impression can be used in automatically generating hearing aid shells by detecting additional features needed to automatically generate hearing aid shells.

Figure 11:
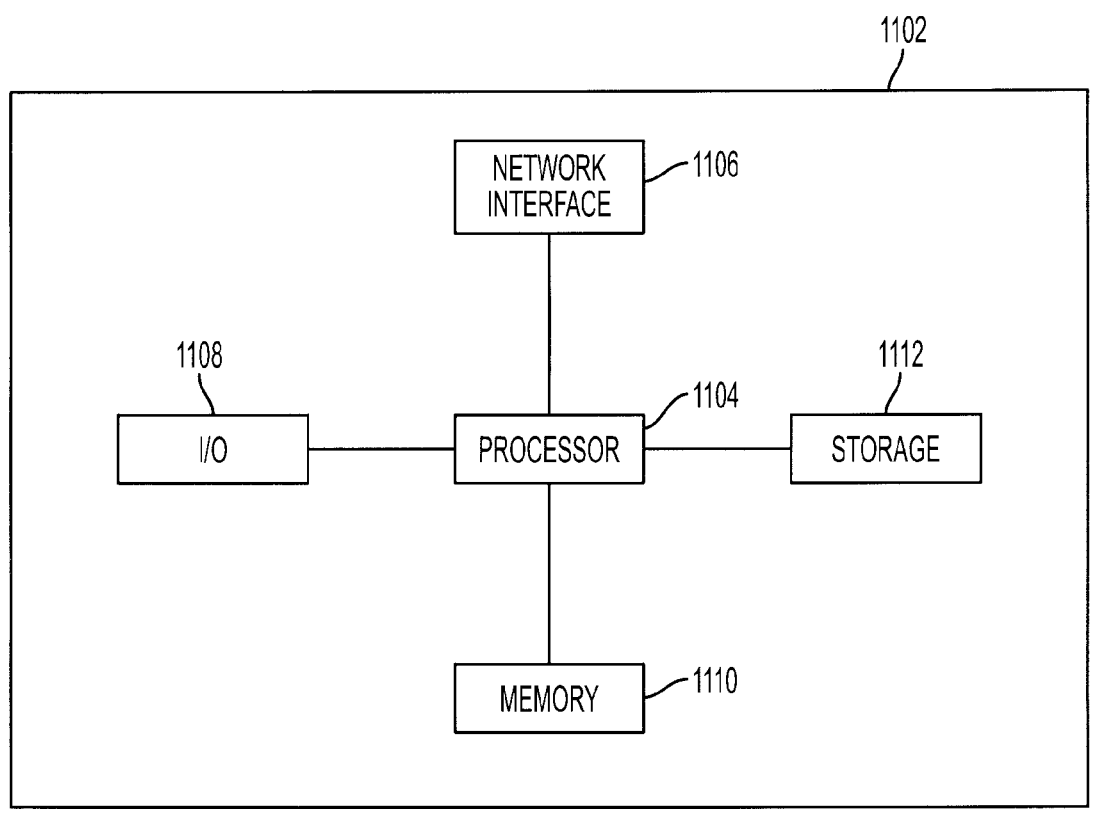
FIG. 11 is a high level block diagram of a computer capable of implementing the present invention.

The above described method for side detection of a 3D undetailed ear impression can be implemented on a computer using well-known computer processors, memory units, storage devices, computer software, and other components. A high level block diagram of such a computer is illustrated in FIG. 11. Computer 1102 contains a processor 1104 which controls the overall operation of the computer 1102 by executing computer program instructions which define such operation. The computer program instructions may be stored in a storage device 1112 (e.g., magnetic disk) and loaded into memory 1110 when execution of the computer program instructions is desired. Thus, the method steps of the methods of FIGS. 1, 3, and 9, can be defined by the computer program instructions stored in the memory 1110 and/or storage 1112 and controlled by the processor 1104 executing the computer program instructions. Furthermore, the 3D undetailed ear impression can be stored as data in the memory 1110 and/or the storage 1112. The computer 1102 also includes one or more network interfaces 1106 for communicating with other devices via a network. The computer 1102 also includes other input/output devices 1108 that enable user interaction with the computer 1102 (e.g., display, keyboard, mouse, speakers, buttons, etc.) One skilled in the art will recognize that an implementation of an actual computer could contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for side detection of a 3D undetailed ear impression, comprising:
   receiving a 3D undetailed ear impression;
   defining a local coordinate system of the 3D undetailed ear impression based on side independent features of the 3D undetailed ear impression;
   detecting a skeleton of the 3D undetailed ear impression, wherein said skeleton is a center spline of the 3D undetailed ear impression; and
   determining whether the 3D undetailed ear impression is a left or right ear impression based on said skeleton and said local coordinate system of the 3D undetailed ear impression.

2. The method of claim 1, wherein said step of receiving a 3D undetailed ear impression comprises:
   receiving the 3D undetailed ear impression as a 3D point cloud; and
   triangulating said 3D point cloud to generate a surface for the 3D undetailed ear impression.

3. The method of claim 1, wherein said step of defining a local coordinate system of the 3D undetailed ear impression comprises:
   detecting a bottom plane of the 3D undetailed ear impression;
   defining a y direction of the local coordinate system based on said bottom plane;
   detecting an aperture plane of the 3D undetailed ear impression;
   defining an x direction of the local coordinate system based on said aperture plane and said y direction; and
   defining a z direction of the local coordinate system based on said x direction and said y direction.

4. The method of claim 3, wherein said step of detecting a skeleton of the 3D undetailed ear impression comprises:
   detecting a plurality of center points along a vertical scanning of the 3D ear impression;
   fitting a first spline to the plurality of center points; and
   re-scanning the 3D undetailed ear impression at each point of the spline to generate new center points; and
   fitting a second spline to the new center points to generate a smooth skeleton.

5. The method of claim 4, wherein said step of determining whether the 3D undetailed ear impression is a left or right ear impression comprises:
   determining a reference direction for said skeleton;
   calculating a dot product of said reference direction and said x direction of the local coordinate system;
   if said dot product is positive, determining that the 3D undetailed ear impression is a right ear impression; and
   if said dot product is not positive, determining that the 3D undetailed ear impression is a left ear impression.

6. The method of claim 5, wherein said step of determining a reference direction for said skeleton comprises:
   defining said reference direction as a direction from a center point of said skeleton to a point in said 3D undetailed ear impression that is the average of endpoints of said skeleton.

7. The method of claim 1, further comprising:
   detecting ear features in said 3D undetailed ear impression based on the determination of whether the 3D undetailed ear impression is a left or right ear impression.

8. The method of claim 7, further comprising:
   generating a hearing aid shell from said 3D undetailed ear impression based on the ear features detected based on the determination of whether the 3D undetailed ear impression is a left or right ear impression.

9. An apparatus for side detection of a 3D undetailed ear impression, comprising:
   means for receiving a 3D undetailed ear impression;
   means for defining a local coordinate system of the 3D undetailed ear impression based on side independent features of the 3D undetailed ear impression;
   means for detecting a skeleton of the 3D undetailed ear impression, wherein said skeleton is a center spline of the 3D undetailed ear impression; and
   means for determining whether the 3D undetailed ear impression is a left or right ear impression based on said skeleton and said local coordinate system of the 3D undetailed ear impression.

10. The apparatus of claim 9, wherein said means for receiving a 3D undetailed ear impression comprises:
    means for receiving the 3D undetailed ear impression as a 3D point cloud; and
    means for triangulating said 3D point cloud to generate a surface for the 3D undetailed ear impression.

11. The apparatus of claim 9, wherein said means for defining a local coordinate system of the 3D undetailed ear impression comprises:
    means for detecting a bottom plane of the 3D undetailed ear impression;
    means for defining a y direction of the local coordinate system based on said bottom plane;
    means for detecting an aperture plane of the 3D undetailed ear impression;
    means for defining an x direction of the local coordinate system based on said aperture plane and said y direction; and
    means for defining a z direction of the local coordinate system based on said x direction and said y direction.

12. The apparatus of claim 11, wherein said means for detecting a skeleton of the 3D undetailed ear impression comprises:
    means for detecting a plurality of center points along a vertical scanning of the 3D ear impression;
    means for fitting a spline to the plurality of center points; and
    means for re-scanning the 3D undetailed ear impression at each point of the spline to generate new center points; and
    means for fitting a second spline to the new center points to generate a smooth skeleton.

13. The apparatus of claim 12, wherein said means for determining whether the 3D undetailed ear impression is a left or right ear impression comprises:
    means for determining a reference direction for said skeleton;
    means for calculating a dot product of said reference direction and said x direction of the local coordinate system; and
    means for determining that the 3D undetailed ear impression is a right ear impression if said dot product is positive and a left ear impression if said dot product is not positive.

14. The apparatus of claim 13, wherein said means for determining a reference direction for said skeleton comprises:
    means for defining said reference direction as a direction from a center point of said skeleton to a point in said 3D undetailed ear impression that is the average of endpoints of said skeleton.

15. The apparatus of claim 9, further comprising:
    means for detecting ear features in said 3D undetailed ear impression based on the determination of whether the 3D undetailed ear impression is a left or right ear impression; and
    means for generating a hearing aid shell from said 3D undetailed ear impression based on the ear features detected based on the determination of whether the 3D undetailed ear impression is a left or right ear impression.

16. A non-transitory computer readable medium encoded with computer executable instructions for side detection of a 3D undetailed ear impression, the computer executable instructions defining steps comprising:
    receiving a 3D undetailed ear impression;

defining a local coordinate system of the 3D undetailed ear impression based on side independent features of the 3D undetailed ear impression;

detecting a skeleton of the 3D undetailed ear impression, wherein said skeleton is a center spline of the 3D undetailed ear impression; and determining whether the 3D undetailed ear impression is a left or right ear impression based on said skeleton and said local coordinate system of the 3D undetailed ear impression.

17. The non-transitory computer readable medium of claim 16, wherein the computer executable instructions defining the step of receiving a 3D undetailed ear impression comprise computer executable instructions defining the steps of:

receiving the 3D undetailed ear impression as a 3D point cloud; and triangulating said 3D point cloud to generate a surface for the 3D undetailed ear impression.

18. The non-transitory computer readable medium of claim 16, wherein the computer executable instructions defining the step of defining a local coordinate system of the 3D undetailed ear impression comprise computer executable instructions defining the steps of:

detecting a bottom plane of the 3D undetailed ear impression;

defining a y direction of the local coordinate system based on said bottom plane;

detecting an aperture plane of the 3D undetailed ear impression;

defining an x direction of the local coordinate system based on said aperture plane and said y direction; and defining a z direction of the local coordinate system based on said x direction and said y direction.

19. The non-transitory computer readable medium of claim 18, wherein the computer executable instructions defining the step of detecting a skeleton of the 3D undetailed ear impression comprise computer executable instructions defining the steps of:

detecting a plurality of center points along a vertical scanning of the 3D ear impression;

fitting a spline to the plurality of center points; and re-scanning the 3D undetailed ear impression at each point of the spline to generate new center points; and fitting a second spline to the new center points to generate a smooth skeleton.

20. The non-transitory computer readable medium of claim 19, wherein the computer executable instructions defining the step of determining whether the 3D undetailed ear impression is a left or right ear impression comprise computer executable instructions defining the steps of:

determining a reference direction for said skeleton;

calculating a dot product of said reference direction and said x direction of the local coordinate system;

if said dot product is positive, determining that the 3D undetailed ear impression is a right ear impression; and if said dot product is not positive, determining that the 3D undetailed ear impression is a left ear impression.

21. The non-transitory computer readable medium of claim 20, wherein the computer executable instructions defining the step of determining a reference direction for said skeleton comprise computer executable instructions defining the step of:

defining said reference direction as a direction from a center point of said skeleton to a point in said 3D undetailed ear impression that is the average of endpoints of said skeleton.

22. The non-transitory computer readable medium of claim 16, further comprising computer executable instructions defining the steps of:

detecting ear features in said 3D undetailed ear impression based on the determination of whether the 3D undetailed ear impression is a left or right ear impression; and generating a hearing aid shell from said 3D undetailed ear impression based on the ear features detected based on the determination of whether the 3D undetailed ear impression is a left or right ear impression.

* * * * *